United States Patent [19]

Kaminaga et al.

[11] Patent Number: 4,744,879

[45] Date of Patent: * May 17, 1988

[54] OXYGEN-CATHODE FOR USE IN ELECTROLYSIS OF ALKALI CHLORIDE AND PROCESS FOR PREPARING THE SAME

[75] Inventors: Tetsuo Kaminaga, Abiko; Masatomo Shigeta; Hiroyuki Fukuda, both of Iwaki, all of Japan

[73] Assignee: Kureha Kagaku Kogyo Kabushiki Kaisha, Tokyo, Japan

[*] Notice: The portion of the term of this patent subsequent to Jun. 23, 2004 has been disclaimed.

[21] Appl. No.: 817,541

[22] Filed: Jan. 10, 1986

Related U.S. Application Data

[63] Continuation-in-part of Ser. No. 751,525, Jul. 3, 1985, Pat. No. 4,675,094.

[30] Foreign Application Priority Data

Jul. 12, 1984 [JP] Japan ................. 59-143301

[51] Int. Cl.⁴ ............................................. C25B 11/12
[52] U.S. Cl. ............................ 204/294; 156/242; 156/279; 156/280; 156/330; 156/335; 204/98; 204/279; 204/290 R; 264/105
[58] Field of Search ............... 204/294, 98, 128, 279, 204/290 R; 264/105, 125, 126, 127; 156/242, 279, 280, 330, 335

[56] References Cited

U.S. PATENT DOCUMENTS

| | | | |
|---|---|---|---|
| 4,278,525 | 7/1981 | Gestaut | 204/294 |
| 4,294,893 | 10/1981 | Iemmi et al. | 204/294 |
| 4,330,704 | 5/1982 | Jenien | 264/105 |
| 4,350,608 | 9/1982 | Gestaut | 264/105 |
| 4,414,092 | 11/1983 | Lu et al. | 204/294 |
| 4,426,340 | 1/1984 | Goller et al. | 264/105 |
| 4,456,521 | 6/1984 | Solomon et al. | 204/294 |
| 4,459,197 | 7/1984 | Solomon | 204/294 |
| 4,518,705 | 5/1985 | Solomon et al. | 204/294 |

FOREIGN PATENT DOCUMENTS

| | | | |
|---|---|---|---|
| 1471644 | 7/1964 | Fed. Rep. of Germany | 204/294 |
| 0063474 | 8/1967 | Fed. Rep. of Germany | 204/294 |
| 2023916 | 6/1978 | United Kingdom | 204/294 |
| 2075060 | 11/1981 | United Kingdom | 204/294 |
| 2126410 | 8/1982 | United Kingdom | 204/294 |
| 2126775 | 10/1982 | United Kingdom | 204/294 |
| 0332041 | 11/1972 | U.S.S.R. | 204/294 |

Primary Examiner—John F. Niebling
Assistant Examiner—Kathryn Rubino
Attorney, Agent, or Firm—Oblon, Fisher, Spivak, McClelland & Maier

[57] ABSTRACT

Disclosed herein are an oxygen-cathode for use in electrolysis or an alkali chloride, comprising a current collector made of a compact carbonaceous material, electrode substrate(s) made of a porous carbonaceous material and the catalyst carried on the electrode substrate(s), wherein the electrode substrate(s) and the current collector have been joined together and integrated into one body as carbon, and a process for preparing the oxygen-cathode.

12 Claims, 4 Drawing Sheets

Fig. 11
Fig. 12
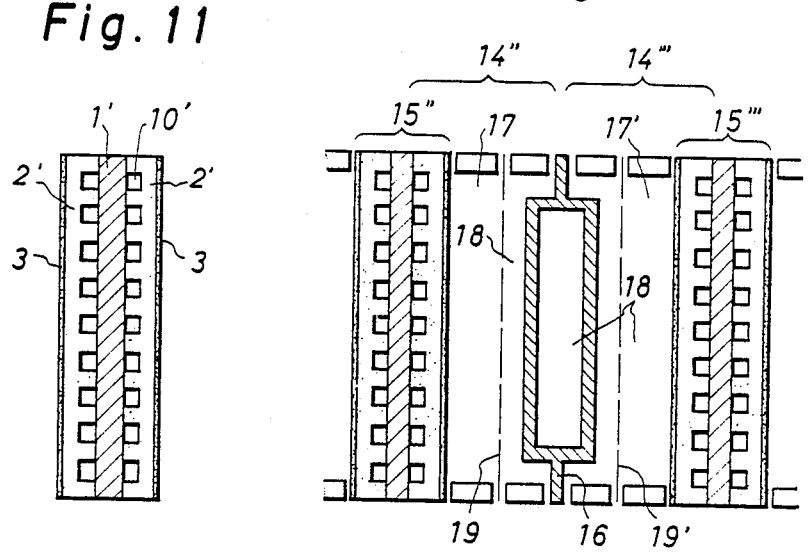
Fig. 13
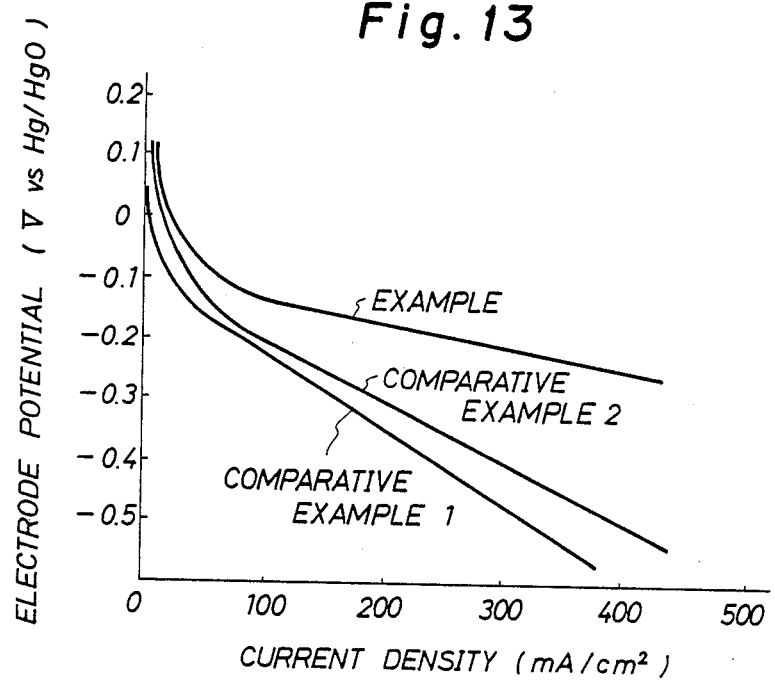

OXYGEN-CATHODE FOR USE IN ELECTROLYSIS OF ALKALI CHLORIDE AND PROCESS FOR PREPARING THE SAME

CROSS-REFERENCE TO RELATED APPLICATION

The present application is a continuation-in-part of application, Ser. No. 751,525 filed July 3, 1985, now U.S. Pat. No. 4,675,094.

BACKGROUND OF THE INVENTION

The present invention relates to an oxygen-cathode used in a process for electrolysis of an alkali chloride, particularly in a process for electrolysis of the alkali chloride while using an ion-exchange membrane or a process for electrolysis of the alkali chloride according to SPE method, wherein a cathode reaction is caused by supplying oxygen or an oxygen-containing gas such as air into the inner part of the cathode, thereby carrying out the electrolysis of an aqueous solution of the alkali chloride without generating hydrogen in the cathode side in an electrolytic cell.

In recent years, in the industry of alkali chloride electrolysis, the diaphragm method has come to be used instead of the mercury electrode method in view of preventing the environmental pollution, and further, the ion-exchange membrane method has come to be more used in order to obtain sodium hydroxide at a higher purity and in a higher concentration. Also the SPE method has been developed for carrying out electrolysis under a voltage as low as possible while eliminating the ohmic loss due to the aqueous electrylyte solution.

In order to effect the electrolysis at a still lower voltage in the above-mentioned ion-exchange membrane method or in the SPE method, various studies have been carried out, and particularly concerning the cathode used in the electrolysis, it has been recently known that in the case where oxygen or an oxygen-containing gas such as air is supplied to the cathode side from outside of the cell, the gas diffuses into the cathode, the oxygen reacts with water in an aqueous solution in the vicinity of the cathode to form hydroxide ions thus preventing the generation of hydrogen in the cathode side and accordingly, the electrolysis can be effected at a lower voltage than that of the usual case without generating a hydrogen gas in the vicinity of the cathode.

The cathode used in the recently known method is called as the "oxygen-cathode", and must have a specified construction by which the supplied gas diffuses into the internal part of the cathode, and it is still required that the cathode is excellent in the cathode specificity and also in durability.

In addition, a device is also necessary for preventing the leakage of the aqueous solution present in the vicinity of the cathode through the gas-permeable cathode.

Hitherto, as the above-mentioned oxygen-cathodes, (1) an oxygen-cathode produced by mixing a hydrophobic material such as particles of polytetrafluoroethylene with a catalytic substance, hardening the mixture and adhering closely the thus hardened product to the current collector such as a nickel grid, a reticulated material or a porous material, (2) an oxygen-cathode produced by impregnating a porous, sintered alloy with the catalytic substance and subjecting the thus impregnated alloy to the hydrophobic treatment with polytetrafluoroethylene (for instance, refer to Japanese Patent Application Laying-Open No. 54-97600 (1979)) or (3) an oxygen-cathode having an improved cathode-performance by adding a specific pore-forming agent to the baked material of the blended mixture of the catalytic substance and a hydrophobic substance (for instance, refer to Japanese Patent Application No. 55-28216 (1970)) have been known, however, in the case where the sintered alloy is used as the micropore layer, there are demerits that it is difficult to control the distribution of the pore size and the thin alloy material is apt to be broken. In the case where the active layer of the cathode is made by hardening particles of polytetrafluoroethylene, etc., the thus prepared cathode is still insufficient in its performance and there is a problem in joining with the current collector. In either case, contact resistance is caused between the electrode substrate and the current collector and accordingly, it is impossible to obtain any product having a sufficient performance as the oxygen-cathode for use in electrolysis of an alkali chloride.

In consideration of the above-mentioned problems, the object of the present invention is to provide an improvement of the cathode substrate to be used in electrolysis of an alkali chloride and solution of the problems on the joining-ability of the cathode substrate and the current collector. As a result of studying the problem, inventors have found the object of the present invention has been achieved by (1) preparing the electrode substrate by using an anticorrosive and durable material in which the control of porosity and pore size is easily carried out and (2) integrating the electrode substrate with the current collector into one body, thereby reducing the contact resistance as small as possible.

SUMMARY OF THE INVENTION

In a first aspect of the present invention, there is provided an oxygen-cathode for use in electrolysis of an alkali chloride, comprising a current collector made of a compact carbonaceous material, an electrode substrate made of a porous carbonaceous material and a catalyst carried on said electrode substrate, wherein said current collector and said electrode substrate are joined together and intergrated into one body as carbon.

In a second aspect of the present invention, there is provided a process for preparing an oxygen-cathode for use in electrolysis of an alkali chloride, comprising the steps of (1) facing a surface to be joined of a molded mixture for producing an electrode substrate, which has not been baked, with a surface to be joined of a current collector material which is produced by mixing a carbonaceous material and a binding material, molding the thus obtained mixture and preliminarily baking the thus molded mixture at 500° to 1500° C. when the carbonaceous material is hard carbon particles or at higher than 2000° C. when said carbonaceous material is soft carbon particles, said molded mixture for producing said electrode substrate being produced by mixing carbon fibers, a binding material and a micropore-forming substance as the starting materials and molding the thus obtained mixture under a pressure and optionally subjecting the thus molded mixture to extraction with the solvent to remove said micropore-forming substance from said molded mixture, (2) joining said molded mixture for producing said electrode substrate and said current collector material under a pressure, (3) baking the thus joined material, thereby integrating said molded mixture for said electrode substrate and said current collector material into one body as carbon and at the same time, compactly carbonizing said current collector material and porously carbonizing said molded mixture for producing said electrode substrate, and (4) subjecting said porously carbonized electrode substrate to hydrophobic treatment, and coating the thus treated surface of said electrode substrate with a catalyst.

BRIEF EXPLANATION OF DRAWINGS

Of the attached drawings,

FIG. 11 is a cross-sectional view of another example of an oxygen-cathode; and

FIG. 12 is a cross-sectional view of an electrolytic cell in the case where the oxygen-cathode shown in FIG. 11 had been applied; and FIG. 13 shows a result of determination of the performance of the oxygen-cathode according to the present invention.

DETAILED DESCRIPTION OF THE INVENTION

According to the present invention, both an electrode (cathode) substrate and a current collector are formed of a carbonaceous material, thereby the joining-ability between the electrode substrate and the current collector has been highly improved.

Namely, the present invention relates to the "oxygen-cathode" for use in electrolysis of an alkali chloride, comprising a current collector made of a compact carbonaceous material, an electrode substrate made of a porous carbonaceous material and the catalyst carried on the electrode substrate wherein the current collector and the electrode substrate have been integrated into one body as carbon, and a process for preparing the same.

Figure 1:
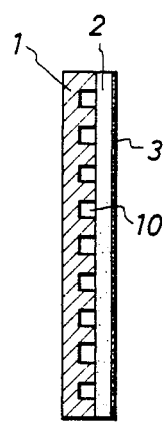
FIG. 1 is a cross-sectional view of one example of the oxygen-cathode according to the present invention.
Figure 2:
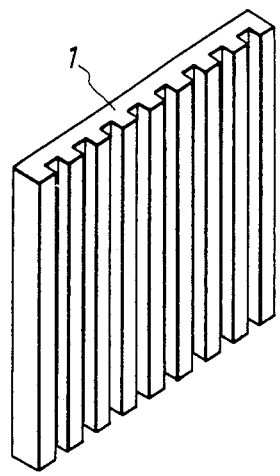
FIG. 2 is a perspective view of a current collector for use in the oxygen-cathode of FIG. 1.
Figure 3:
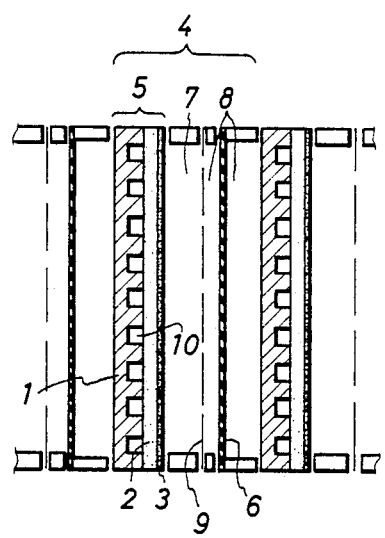
FIG. 3 is a cross-sectional view of an electrolytic cell in the case where the oxygen-cathode shown in FIG. 1 had been applied.
Figure 4:
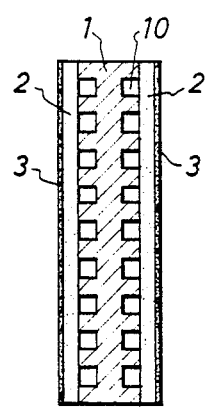
FIG. 4 is also a cross-sectional view of an oxygen-cathode to which a current collector of another construction has been used.
Figure 5:
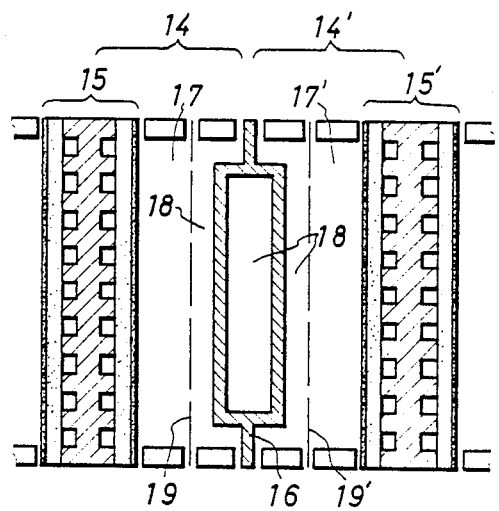
FIG. 5 is a cross-sectional view of an electrolytic cell in the case where the oxygen-cathode shown in FIG. 4 has been applied.
Figure 6:
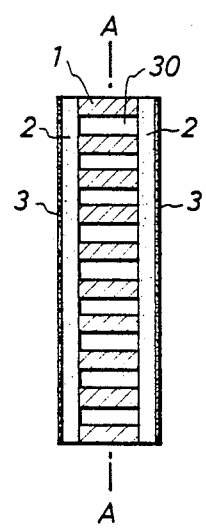
FIG. 6 is a cross-sectional view of an oxygen-cathode to which a current collector of still another construction had been used.
Figure 7:
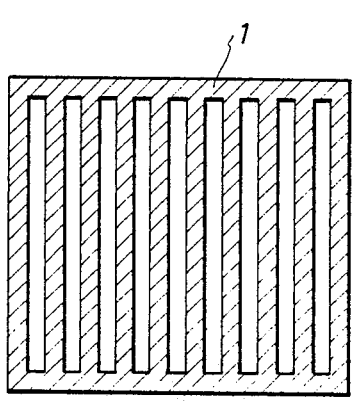
FIG. 7 is a A—A sectional view of the oxygen-cathode shown in FIG. 6.

FIG. 1 is a cross-sectional view of one example of the oxygen-cathode used in an electrolytic cell shown in FIG. 3 according to the present invention for use in electrolysis, where 1 is a ribbed current collector made of a compact carbonaceous material, 2 is an electrode substrate made of a porous carbonaceous material and the ribbed current collector 1 is joined to the electrode substrate 2. In FIG. 1 the catalyst is carried on the electrode substrate in an impregnated state within the micropores thereof, and in case of necessity, a catalyst layer 3 is formed on the upper surface of the electrode substrate. FIG. 2 is a ribbed current collector used in the oxygen-cathode shown FIG. 1. FIG. 3 shows a cross-sectional view of a bipolar type electrode to which the oxygen-cathode shown in FIG. 1 has been applied. In FIG. 3, 4 is a unit of an electrolytic cell; 5 is the "oxygen-cathode" including the ribbed current collector 1, the electrode substrate 2 and the catalyst (catalyst layer) 3 carried on the electrode substrate 2, 6 is an anode and 10 is the passage of gaseous oxygen supplied from outside of the cell to the cathode chamber. The cathode chamber 7 and the anode chamber 8 shown in FIG. 3 are divided by an ion-exchange membrane 9. Both FIG. 4 and FIG. 6 are the respective cross-sectional views of the two oxygen-cathodes, in each of which ribbed current collectors 1 of different structure are applied and interposed between two electrode substrates 2. FIG. 7 is the cross-sectional view along the line A—A of oxygen-cathode of FIG. 6. FIG. 5 is cross-sectional view of an electrolytic cell of monopolar type to which the oxygen-cathode shown in FIG. 4 is applied, wherein a unit 14 or 14' of the electrolytic cell is composed of the one side of the oxygen-cathode 15 or 15', the cathode chamber 17 or 17', the anode chamber 18 and the anode 16, and the chambers 17 or 17' and 18 are divided by the cation-exchange membrane 19 or 19'.

In the electrolytic cell shown in FIG. 5, the oxygen-cathode shown in FIG. 6 may be used instead of the oxygen-cathode cathode shown in FIG. 4.

Figure 8:
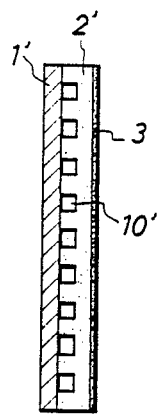
FIG. 8 is a cross-sectional view of another example of an oxygen-cathode according to the present invention.
Figure 9:
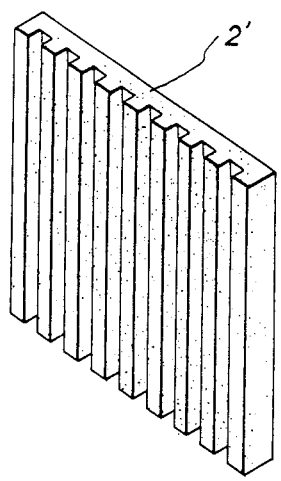
FIG. 9 is a perspective view of a ribbed electrode substrate used in an oxygen-cathode of FIG. 8 and FIG. 10 to 12.
Figure 10:
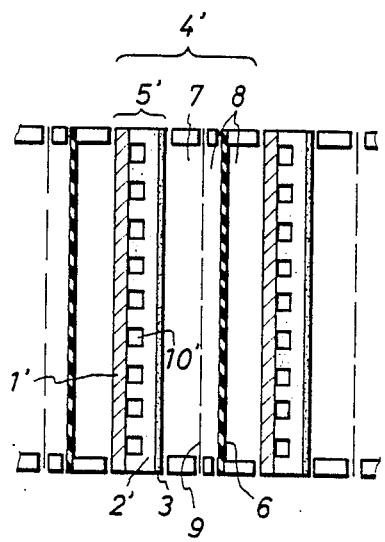
FIG. 10 is a cross-sectional view of an electrolytic cell in the case where the oxygen-cathode shown in FIG. 8 had been applied.

In the oxygen-cathode shown in FIG. 6, 30 is the passage of gaseous oxygen in the current collector. FIG. 9 is a perspective view of a ribbed electrode substrate 2', FIG. 8 is a cross-sectional view of an oxygen-cathode comprising a current collector 1' having both flat side, the ribbed electrode substrate 2' with passage 10' of gaseous oxygen and the catalyst 3 carried on a non-ribbed flat surface of the electrode substrate 2'. FIG. 10 shows a cross-sectional view of a bipolar type electrolytic cell to which the oxygen-cathode shown in FIG. 8 is applied. In FIG. 10, 4' is a unit of an electrolytic cell, 5' is the oxygen-cathode shown in FIG. 8, 6 is an anode, and 10' is the passage of gaseous oxygen supplied from outside of the cell to the cathode chamber. The cathode chamber 7 and the anode chamber 8 in FIG. 10 are divided by an ion-exchange membrane 9. FIG. 11 is a cross-sectional view of another oxygen-cathode comprising two ribbed electrode substrate 2' with passage 10' of gaseous oxygen, two catalyst layers 3 respectively carried on a non-ribbed flat surface of the electrode substrate 2' and a current collector 1' having both flat side and interposing between each ribbed surface of the two electrode substrates 2'. FIG. 12 shows a cross-sectional view of an electrolytic cell of monopolar type to which the oxygen-cathodes shown in FIG. 11 are applied. In FIG. 12, 14" and 14''' are a unit of electrolytic cell comprising the one side of oxygen-cathodes 15" and 15'" and anode 16 respectively, cathode chambers 17 and 17', and anode chamber 18, respectively, and the cathode chambers 17 and 17' and the anode chamber 18 are divided respectively by ion-exchange membranes 19 and 19'.

Each of the elements of the oxygen-cathode is explained as follows.

ELECTRODE SUBSTRATE

The electrode substrate for use according to the present invention preferably has the following physical properties for use as an oxygen-cathode.

Thickness is 0.2 to 2 mm, pore diameter is 5 to 100 μm, permeability to air is not less than 5 ml/cm·hour·mmH$_2$O, bending strength is not less than 30 kg/cm$^2$, electric resistance is not more than 50 mΩ·cm and thermal conductivity is not less than 0.5 kcal/m·hour·°C.

The electrode substrate having the above-mentioned physical properties is prepared, for instance, by mixing carbon fibers, a binding material and a micropore-forming substance, molding the thus obtained mixture subjecting the thus molded mixture to extration with a solvent in the case where the micropore-forming substance is soluble in a solvent thereby removing the micropore-forming substance from the thus molded mixture and baking the thus treated molded mixture, thereby obtaining the electrode substrate made of a porous material. In the case where the micropore-forming substance is volatile at high temperatures, the thus molded mixture is directly baked without being subjected to extraction, thereby obtaining the electrode substrate made of a porous material.

The above-mentioned respective processes for preparing the electrode substrate have been disclosed in Japanese Patent Applications Laying-Open No. 57-166354 (1982) and No. 58-117649 (1983), respectively, and the concrete example of the processes is explained as follows.

Ten to 80% by weight of carbon fibers having 6 to 20 μm in diameter and 0.05 to 2 mm in length obtained by baking at a temperature of higher than 1500° C. as an aggregate, 10 to 50% by weight of a substance selected from the group consisting of phenol resin, pitch derived from petroleum or coal, polyvinyl alcohol, epoxy resin and the mixtures thereof as a binding material and 10 to 60% by weight of a substance which is volatile at high temperatures and is selected from the group consisting of polyethylene, polyvinyl alcohol, polymethyl-methacrylate, nylon and the mixtures thereof, or substance which is soluble in a certain solvent and is selected from the group consisting of sodium chloride, sucrose, sodium sulfate polyvinyl alcohol, polyvinyl chloride, polymethyl methacrylate and the mixtures thereof as the micropore-forming substance are mixed together. After molding the thus obtained mixture at a temperature of 50° to 200° C. under the pressure of 0.01 to 200 kg/cm$^2$, (i) in the case where the micropore-forming substance is soluble in a certain solvent, the micropore-forming substance is removed from the thus molded mixture by extraction thereof with the solvent and then the thus treated, molded mixture joined with the current collector material is finally baked at a temperature of 1,500° to 3,000° C., or (ii) in the case where the micropore-forming substance is volatile at high temperature, the molded mixture joined with the current collector material is directly baked finally at a temperature of 1500° to 3000° C. without being subjected to the above-mentioned extraction.

The ribbed electrode substrate such as shown in FIG. 9 is prepared by using a conventional ribbed metal mold or the like having the predetermined shape in the above molding step of the mixture of the carbon fibers, the binding material and the micropore-forming substance, and subjecting the thus obtained molded mixture to the above-mentioned succeeding process.

The control of the micropore (pore size and porosity) and the formation thereof are easily carried out in the above-mentioned steps of preparing the electrode substrate, and the thus prepared electrode substrate is excellent in carrying the catalyst and the state of dispersion of the supplied oxygen within the electrode substrate is favorable.

CURRENT COLLECTOR

As has been stated, the current collector for use in the present invention is made of a compact carbonaceous material, and preferably has the following physical properties.

Permeability to air is not more than $10^{-3}$ ml/cm·hr·mmH$_2$O,
bending strength is not less than 500 kg/cm$^2$,
electric resistance is not more than 10 mΩ·cm and
thermal conductivity is not less than 3 kcal/m·hour·°C.

In the case where the oxygen-cathode such as shown in FIG. 4, FIG. 6 and FIG. 11 is used in an electrolytic cell, the air permeability of the current collector used therein is preferably not more than $10^{-3}$ ml/cm·hr·mm H$_2$O Further, in the case where the oxygen-cathode such as shown in FIG. 1 and FIG. 8 is used in an electrolytic cell, the air permeability of the current collector used therein is preferably not more than $10^{-7}$ ml/cm·hr·mm H$_2$O The compact carbonaceous material of the above-mentioned physical properties can be prepared, for instance, as follows.

From 30 to 90% by volume of hard carbon particles obtained by baking a commerciallized powdery pitch derived from petroleum or coal, cooling and pulverizing thereof having 1 to 100 μm in diameter and not more than 1.8 g/ml in density, 70 to 10% by volume of a granulated binding material having 1 to 100 μm in diameter of one or more substances selected from the group consisting of phenol resin, pitch derived from petroleum or coal, polyvinyl alcohol and epoxy resin are mixed together, and after molding the thus prepared mixture at a temperature of 80° to 200° C. under the pressure of 10 to 400 kg/cm$^2$, the thus molded mixture is baked at a temperature of from 500° to 1,500° C. to obtain a current collector material. Instead of using the above-mentioned hard carbon particles, soft carbon particles having from 1 to 100 μm in diameter and a bulk density of not less than 1.8 g/ml can be used. In addition, as the binding material, a liquid binder selected from the group consisting of liquid phenol resin, liquid pitch derived from petroleum or coal, liquid epoxy resin, liquid polyvinyl alcohol and the mixtures thereof can be used.

The current collector is produced by baking the current collector material joined with the electrode substrate or the molded mixture therefor to be in a structure by which oxygen or an oxygen-containing gas such as air can be introduced thereinto from outside and supplied to the cathode. FIG. 2 is a perspective view of the current collector for use in the oxygen-cathode of a construction shown in FIG. 1. The current collector shown in FIG. 2 has been made to be a plate-shaped body in which a plurality of ribs, for instance, of 2 to 10 mm in sectional dimension and 4 to 20 mm in pitch are provided on one side. Concerning the structure of the current collector, a variety of application is considered.

On the other hand, a current collector interposed between two electrode substrates such as used in the oxygen-cathode shown in FIG. 4, FIG. 6 and FIG. 11 is prepared by molding a mixture of soft carbon particles of graphite and/or graphitizable carbon and a graphitizable binding material such as pitch derived from coal or petroleum at about 150° to about 200° C., pre-baking at about 850° C. and baking the pre-baked material at a temperature of higher than 2000° C. to obtain a graphitic current collector derived from the soft carbon particles. As the such graphitic current collector, the product having a trade name of A-280 produced by Toyo Carbon Co. Ltd., is commercially available.

JOINING OF ELECTRODE SUBSTRATE WITH CURRENT COLLECTOR

As has been stated above, the thus respectively prepared electrode substrate or the molded mixture for producing thereof and current collector material are joined together to a bonded body by facing the respective two surfaces to be joined and subjecting the thus faced electrode substrate or the molded mixture therefor and current collector material to the thermal treatment at a temperature of 80° to 200° C. under the pressure of 0.01 to 200 kg/cm$^2$ and then, the thus joined electrode substrate or the molded mixture therefor and current collector material was baked at a temperature of not less than 1,500° C. to be in a shape shown in FIGS. 1, 4, 6, 8, and 11, wherein the electrode substrate and the current collector are integrated into one body.

In the case where the electrode substrate obtained by already baking the molded mixture therefor not together with the current collector material is joined with the current collector material, a binding material is necessary between the electrode substrate and the current collector material, and as the binding material, the substance selected from the group consisting of phenol resin, pitch derived from petroleum or coal, polyvinyl alcohol, epoxy resin and the mixture thereof is utilized.

The thus joined electrode substrate and current collector via the binding material is baked at a temperature of 1,500° to 3000° C.

On the other hand, in the case where the baking of the molded mixture for producing the electrode substrate is combined with the baking step in the joining of the current collector material with the molded mixture for producing the electrode substrate, the baking is carried out after joining the current collector material with the molded mixture for producing the electrode substrate. The preliminary baking of the molded mixture for producing the electrode substrate is carried out for coinciding the thermal behavior of the two components of the joined current collector material and pre-baked electrode substrate. In this case, the binding material is not indispensable, however, the same binding material mentioned above may be used. In the case where the baking of the molded mixture for producing the electrode substrate is combined with the baking step for joining of the molded mixture for producing the electrode substrate with the current collector material, one step of baking of the molded mixture for the electrode substrate is saved and accordingly, the latter case is preferable. By the step of baking, the porously carbonized electrode substrate is obtained and in the same time the compactly carbonized current collector is obtained.

CATALYST

After having integrated the electrode substrate and the current collector into one body as shown above, the catalyst is coated on the surface of electrode substrate. A substance suitable as the catalyst of the oxygen-cathode for use in electrolysis of an alkali chloride has an ability which accelerates the reaction of formation of hydroxide ions from the oxygen introduced into the cathode and water in the aqueous electrolyte solution. Concretely, one of the known catalyst, for instance, a noble metal such as platinum and silver or Raney silver is used for the purpose. Particularly, in the present invention, those carbon black particles having their surface covered with a powdery noble metal, namely, a noble metal carried on carbon black particles is preferable.

As the method for coating such a catalyst into the electrode substrate, a method has been known in which an aqueous suspension containing the particles of the catalyst is coated on the surface of the electrode substrate and the solvent is then removed by drying. The noble metal may be electroplated on the electrode substrate. Instead of electroplating, the following method may be taken wherein the electrode substrate is impregnated with an aqueous solution containing a compound of the metal which can be the catalyst, and the thus introduced compound is thermally decomposed or reduced to the metal within the electrode substrate.

HYDROPHOBIC TREATMENT

Hydrophobic treatment of the oxygen-cathode is carried out in order to prevent the leakage of the aqueous solution in the vicinity of the cathode to the gas side of the oxygen-cathode. As the agent for use in hydrophobic treatment, fluorine-containing polymer such as polytetrafluorethylene is preferable, and in order to prevent the reduction in the activity of the catalyst due to the covering of the surface of the catalyst by the thus applied agent, the agent is applied before the coating of the catalyst, and after coating the catalyst on the thus applied agent, it is molten and adhered to the electrode substrate.

In order to avoid the reduction of electric conductivity of the electrode substrate due to the above-mentioned hydrophobic treatment, in the case of carrying out the hydrophobic treatment it is preferable to coat a mixture of carbon black and the particles of fluorine-containing polymer on the surface of the electrode substrate. For instance, an aqueous emulsion containing the particles of polytetrafluorethylene of from 100 to 5,000 Å in diameter and the particles of carbon black of from 100 to 5,000 Å in diameter is coated on the surface of the electrode substrate, and then an aqueous suspension containing the particles of the catalyst is coated thereon. After removing the solvent of the suspension by drying the thus coated electrode, the electrode substrate is subjected to baking at 300° to 400° C., thereby sintering the particles of polytetrafluoroethylene to obtain a membrane of polytetrafluoroethylene strongly adhered to the surface of the micropores of the electrode substrate.

In addition, both coating of the catalyst and hydrophobic treatment agent can be effected simultaneously by coating a mixture of the particles of polytetrafluoroethylene and the particles of the catalyst.

According to the present invention, the electrode substrate which is mainly composed of the porous carbonaceous material and carries the catalyst thereon, plays a role in dispersing the supplied oxygen. The current collector of the present invention which is mainly composed of the compact carbonaceous material and is integrated with the electrode substrate into one body, plays the role in conducting electricity to the electrode substrate without generating electric contact resistance. In addition, in the case where the current collector is modified to take a suitable structure, the modified current collector plays a role in supplying oxygen to the cathode and gas-sealing to outside of the cell.

The catalyst carried on the electrode substrate is adhered and kept within the plurality of the micropores, however, in case of necessity, the catalyst is also applied to the surface of the electrode substrate.

Furthermore, since in the oxygen-cathode according to the present invention, both the current collector and the electrode substrate are composed of carbonaceous material, and have been integrated into one body, in the case where such oxygen-cathode is used in electrolysis of an alkali chloride, any increase of the electrolytic voltage due to the contact resistance between the current collector and the electrode substrate is not observed and accordingly, electrolysis of the alkali chloride can be carried out at a remarkably lower voltage as compared to the conventional electrolysis of the alkali chloride.

In addition, porous carbonaceous material is used for the electrode substrate and accordingly, the electrode substrate is anticorrosive and durable. Furthermore, since a large number of micropores have been preliminarily formed with their controlled pore diameter in the electrode substrate and it is possible to carry the catalyst particles within such micropores, the catalyst is easily coated on the electrode substrate, and it is possible to obtain the oxygen-cathode excellent in the cathode specificity. Particularly, in the case where the electrode substrate is made from the carbon fibers, the binding material and the micropore-forming substance, it is possible to obtain the oxygen-cathode having the uniformly distributed micropores in which the control of the pore size is easy and distributing oxygen excellently.

The oxygen-cathode according to the present invention may be used in the electrolytic cells in the ion-exchange membrane method and also in the SPE method for electrolysis of an alkali chloride. In addition, it may be used in the electrolytic cell in which only the anode side is composed by the mode of the SPE method for electrolysis of an alkali chloride.

The present invention will be explained more in detail while referring to the following non-limitative example and comparative examples.

EXAMPLE (1) Preparation of the current collector material:

A commercialized powdery pitch derived from petroleum (made by KUREHA KAGAKU KOGYO Co., Ltd., MH-1P) was preliminarily baked in an atmosphere of nitrogen and after cooling thereof, it was pulverized to be of 6 $\mu$m in the mean diameter and used as the hard carbon particles for aggregate.

Namely, 65 % by weight of the hard carbon particles and 35 % by weight of a commercialized phenol resin (more than 85 % by weight of the phenol resin passes throug the sieve of 320 mesh) as the binding material were mixed, and after introducing the uniform mixture in a ribbed metal mold, the mixture was molded under the conditions of 150° C. in temperature and of 100 kg/cm$^2$ in pressure, and the thus molded mixture was baked at 1,000° C. to be carbonized, thereby obtaining the current collector material.

(2) Preparation of the molded mixture for producing the
electrode substrate

35 % by weight of carbon fiber (commercialized after baking at 2,000° C. to carbonize, made by KUREHA KAGAKU KOGYO Co., Ltd., M 20 4T, 19 $\mu$m in diameter and 250 $\mu$m in length), 25 % by weight of a commercialized powdery phenols resin (more than 85 % by weight of the phenol resin passes through the sieve of 320 mesh) as a binding material, 30 % by weight of the particles of polyvinyl alcohol (mesh diameter of 120 $\mu$m) as one of the two micropore-forming substances and 10 % by weight of the particles of polyethylene (mean diameter of 100 $\mu$m) as one of the two micropore-forming substances were mixed together and after introducing the thus obtained uniform mixture on a flat metal mold, the mixture was molded under the conditions of 110° C. in temperature and 35 kg/cm$^2$ in pressure, thereby obtaining the molded mixture for producing the electrode substrate.

(3) Joining of the current collector material with the molded mixture for the electrode substrate:

After facing the thus obtained molded mixture for the electrode substrate with the ribbed side of the thus prepared current collector material, the thus faced two materials were joined under the conditions of 135° C. in temperature and 35 kg/cm$^2$ in pressure and, the thus joined materials were baked at 2,000° C. to be integrated into one body.

(4) Hyrophobic treatment and coating of the catalyst:

The open surface of the electrode substrate which had been thus integrated with the current collector was coated with a mixture of a commercialized emulsion of polytetrafluoroethylene (made by MITSUI Fluorochemical Co., Ltd.) and carbon black, and then the thus coated surface was further coated with an aqueous suspension of carbon black particles having their surface covered with powdery platinum. After drying, the thus dried material was treated at 330° C. to melt the particles of polytetrafluoroethylene whereby the carbon black particles are adhered to the surface of the electrode substrate. The weight ratio of polytetrafluoroethylene remaining on the surface of the electrode substrate to the electrode substrate was 0.2:100 and that of carbon black remaining on the surface of the electrode substrate to the electrode substrate was 0.5:100. The amount of platinum on the surface of the electrode substrate was 1 mg/cm$^2$ of the surface area.

Thus, the oxygen-cathode for use in electrolysis of an alkali chloride according to the present invention was obtained.

(5) Test of the thus obtained electrode

The thus prepared oxygen-cathode was subjected to a test for determining the cathode-specificity (a relationship between the current density and the cathode potential) in the following reaction carried out in an aqueous 9N solution of sodium hydroxide.

$$2\,H_2O + O_2 + 4\,e^- \rightarrow 4\,OH^-$$

The test results are shown in FIG. 13 together with the test results obtained on other oxygen-cathodes shown in Comparative Examples below.

COMPARTIVE EXAMPLE 1

An electrode comprising a nickel wire lattice as the core material and porous carbon material tightened by particles of polytetrafluoroethylene and having a porous membrane of polytetrafluoroethylene on the surface through which air of oxygen is introduced thereinto, which is so-called as nickel-Teflon membrane electrode, was subjected to the same treatment of painting with the catalyst and then to the hydrophobic treatment as in Example. The thus treated electrode was tested under the same conditions as in Example, the results being also shown in FIG. 13.

As are seen in FIG. 13, the oxygen-cathode potential shown by the electrode of Comparative Example 1 was remarkably lower than that of the oxygen-cathode of Example at the same current density. Such a phenomenon is due to (1) the larger electric resistance of the porous carbon electrode and (2) the large contact resistance between the nickel wire lattice which also serves as the current collector and the porous carbon electrode material, and thus, the excellency of the oxygen-cathode according to the present invention due to its nearly-zero contact resistance has been verified.

COMPARATIVE EXAMPLE 2

A current collector material was prepared in the same manner as in Example except for using the baking temperature of 2,000° C. instead of 1,000° C. in Example. A molded mixture for the electrode substrate was prepared in the same manner as in Example, and the molded mixture for the electrode substrate was baked at 2,000° C. before joining with the current collector material to obtain the electrode substrate, and the thus prepared current collector material and the thus prepared electrode substrate were joined together, baked and integrated into one body in the same manner as in Example.

By the subjecting the thus prepared electrode substrate integrated with the current collector to the same hydrophobic treatment and to the coating of the catalyst in the same manner as in Example, the oxygen-cathode were obtained and tested under the same conditions as in Example, the test results being also shown in FIG. 13.

As are seen in FIG. 13, the oxygen-cathode voltage shown by the electrode treated in Comparative Example 2 was lower than that shown by the oxygen-cathode of Example at the same current density. This fact is due to the presence of a larger contact electric resistance between the current collector and electrode substrate in the electrode of Comparative Example 2 than that in the electrode of Example.

We claim:

1. An oxygen-cathode for use in electrolysis of an alkali chloride, comprising a current collector made of a compact carbonaceous material, and at least one electrode substrate made of a porous carbonaceous material having a catalyst carried thereon, wherein said current collector and said electrode substrate are integrated into one body consisting essentially of carbon and said catalyst, wherein said current collector has a permeability to air of not more than $10^{-3}$ ml/cm·hour·mmH$_2$O, a bending strength of not less than 500 kg/cm$^2$, an electric resistance of not more than 10 mΩ·cm and a thermal conductivity of not less than 3 kcal/m·hour·°C., and said electrode substrate has a thickness of 0.2 to 2 mm, a pore diameter of 5 to 100 μm, a permeability to air of not less than 5 ml/cm·hour·mmH$_2$O, a bending strength of not less than 30 kg/cm$^2$, an electric resistance of not more than 50 mΩ·cm and a thermal conductivity of not less than 0.5 kcal/m·hour·°C.

2. An oxygen-cathode according to claim 1, wherein said current collector has ribs and said electrode substrate has no ribs.

3. An oxygen cathode according to claim 2, wherein said current collector having ribs is sandwiched between said two electrode substrates.

4. An oxygen-cathode according to claim 1, wherein said current collector has no ribs and said electrode substrate has ribs.

5. An oxygen-cathode according to claim 4, wherein said current collector is sandwiched between said two electrode substrates.

6. An oxygen-cathod according to claim 1, wherein said electrode substrate is produced by mixing carbon fibers, a binding material and a micropore-forming substance which is volatile at high temperatures, molding the thus obtained mixture under a pressure and baking the thus molded mixture.

7. An oxygen-cathode according to claim 1, wherein said electrode substrate is produced by mixing carbon fibers, a binding material and a micropore-forming substance which is soluble in a solvent, molding the thus obtained mixture under pressure, subjecting the thus molded mixture to extraction with said solvent, thereby removing said micropore-forming substance from said molded mixture and baking the thus obtained molded mixture.

8. A process for preparing an oxygen-cathode for use in electrolysis of an alkali chloride, comprising the steps of (1) facing an unbaked surface of a first molded mixture for producing an electrode substrate, said first molded mixture being produced by mixing carbon fibers, a binding material and a micropore-forming substance and molding the resulting mixture under pressure, with a surface of a current collector, said current collector being produced by mixing a carbonaceous material selected from the group consisting of hard carbon particles and soft carbon particles, and a binding material, molding the thus obtained mixture to form a second molded mixture and preliminarily baking the second molded mixture at a temperature of from 500° to 1500° C. when said carbonaceous material is hard carbon particles, temperature of higher than 2000° C. when said carbonaceous material is hard carbon particles or at a (2) joining said first molded mixture for producing said electrode substrate and said current collector material under pressure, (3) baking the thus joined first molded mixture and current collector, thereby integrating said first molded mixture for said electrode substrate and said current collector material into a unitary body and simultaneously carbonizing said current collector and said first molded mixture whereby said first molded mixture becomes a carbonized electrode substrate with pores formed therein, and wherein after baking said unitary body consists essentially of carbon, and (4) subjecting said carbonized electrode substrate to a hydrophobic treatment, and coating the treated surface of said electrode substrate with a catalyst, wherein said current collector has a permeability to air of not more than $10^{-3}$ ml/cm·hour·mmH$_2$O, a bending strength of not less than 500 kg/cm$^2$, an electric resistance of not more than 10 mΩ·cm and a thermal conductivity of not less than 3 koal/m·hour·°C and said electrode substrate has a thickness of 0.2 to 2 mm, a pore diameter of 5 to 100 μm, a permeability to air of not less than 5 ml/cm·hour·mmH$_2$O, a bending strength of not less than 30 kg/cm$^2$, an electric resistance of not more than 50 mΩ·cm and a thermal conductivity of not less than 0.5 kcal/m·hour·°C.

9. A process according to claim 8, wherein said hard carbon particles are prepared by baking pitch derived from coal or petroleum and pulverizing the baked pitch and said soft carbon particles are graphite particles or graphitizable carbon particles.

10. A process according to claim 8, which further comprises after said baking step, coating said electrode substrate with an emulsion containing particles of fluorine-containing polymer and carbon black, and then further coating the electrode substrate with a suspension containing particles of a catalyst, the solvent in said emulsion and suspension being removed from the coated electrode substrate by drying thereof, and then thermally treating the coated electrode substrate so as to melt and adhere said particles of fluorine-containing polymer to the surface of said electrode substrate, thereby effecting said hydrophobic treatment, and said coating treatment of said catalyst thereinto.

11. A process according to claim 10, wherein said particles of said catalyst comprise carbon black which carries a powdery noble metal on the surface thereof.

12. A process according to claim 8, wherein before said joining, said second molded mixture is subjected to solvent extraction to remove said micropore-forming substance therefrom.

* * * * *